(12) United States Patent
Romeo

(10) Patent No.: US 8,811,646 B1
(45) Date of Patent: Aug. 19, 2014

(54) RETRACTABLE EARPHONE SET

(76) Inventor: Roy P. Romeo, Cecil Park (AU)

(*) Notice: Subject to any disclaimer, the term of this patent is extended or adjusted under 35 U.S.C. 154(b) by 174 days.

(21) Appl. No.: 13/548,568

(22) Filed: Jul. 13, 2012

Related U.S. Application Data

(60) Provisional application No. 61/508,626, filed on Jul. 16, 2011.

(51) Int. Cl.
*H04R 25/00* (2006.01)
*H04M 1/00* (2006.01)

(52) U.S. Cl.
USPC ............... 381/370; 455/575.1; 455/575.6

(58) Field of Classification Search
CPC .... H04R 5/033; H04R 1/1008; H04M 1/6058
USPC ............ 455/575.1, 575.2, 575.6, 575.8; 242/378, 378.4; 381/374, 379, 111, 381/370
See application file for complete search history.

(56) References Cited

U.S. PATENT DOCUMENTS

| | | | |
|---|---|---|---|
| 4,942,617 A | 7/1990 | Boylan | |
| 5,339,461 A | 8/1994 | Luplow | |
| 5,422,957 A | 6/1995 | Cummins | |
| 6,480,611 B2 | 11/2002 | Hashimoto et al. | |
| 6,616,080 B1 * | 9/2003 | Edwards et al. | 242/378.1 |
| 6,619,449 B2 * | 9/2003 | Liao | 191/12.2 R |
| 7,086,512 B2 * | 8/2006 | Shack et al. | 191/12.4 |
| D583,362 S * | 12/2008 | Hsu et al. | D14/205 |
| 7,848,087 B2 * | 12/2010 | Huang | 361/679.02 |
| 8,165,646 B2 * | 4/2012 | Zheng | 455/575.2 |
| 8,365,887 B2 * | 2/2013 | Fischer | 191/12.2 R |
| 8,579,172 B2 * | 11/2013 | Monaco et al. | 224/666 |
| 2002/0023814 A1 * | 2/2002 | Poutiatine | 191/12.2 R |
| 2002/0040945 A1 * | 4/2002 | Stepancich et al. | 242/378.1 |
| 2002/0193151 A1 * | 12/2002 | Edreich | 455/569 |
| 2012/0114162 A1 * | 5/2012 | Zheng | 381/384 |

* cited by examiner

*Primary Examiner* — Sonny Trinh
(74) *Attorney, Agent, or Firm* — Crossley Patent Law; Micah C. Gunn

(57) ABSTRACT

A retractable earphone set including a first spring wheel assembly and a second spring wheel assembly rotatably disposed within a housing, a pair of cables retractably extensible and wound upon the first spring wheel assembly and a connector cable retractable extensible and wound upon the second spring wheel assembly, wherein depression of a first button releases the first spring wheel assembly to rotationally extend and alternately retract the pair of cables from within the housing, and depression of the second push button releases the second spring wheel assembly to rotationally extend and alternately retract the connector cable from within the housing, whereby the retractable earphone set is interconnectable with an electronic device to relay audio signals therebetween and a pair of earphones is retractably extensible from a position most proximal the housing.

7 Claims, 4 Drawing Sheets

RETRACTABLE EARPHONE SET

CROSS-REFERENCE TO RELATED APPLICATIONS

Figure 1:
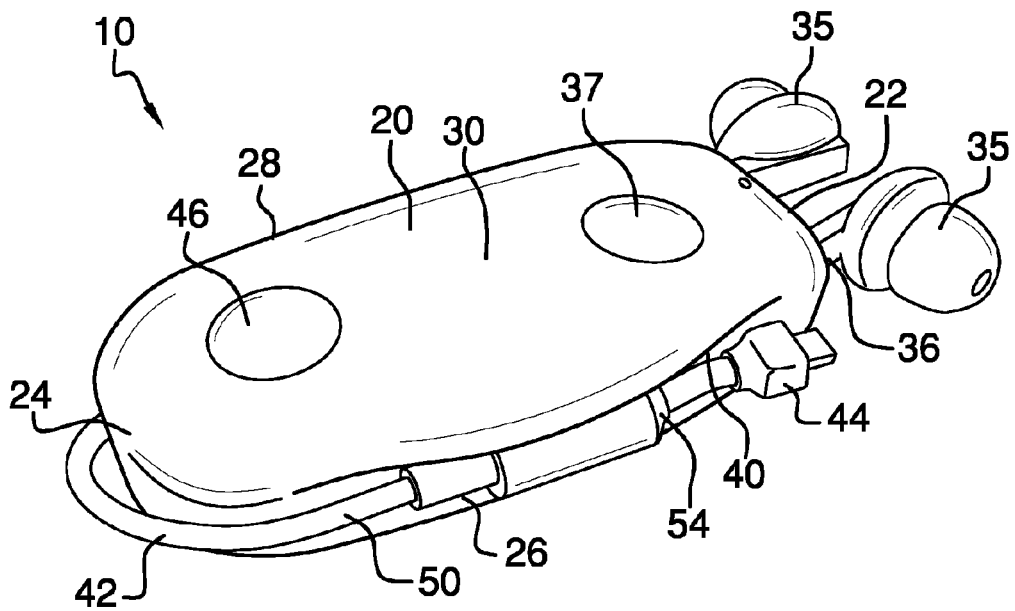

This application claims the benefit of U.S. Provisional Application No. 61/508,626, filed Jul. 16, 2011.

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of earphone sets are known in the prior art. However, what is needed is a retractable earphone set including a housing that has an integral speaker and is designed to operationally communicate with a cellular telephone among other audio equipment.

FIELD OF THE INVENTION

The present invention relates to an earphone set, and more particularly, to a retractable earphone set with a housing that has an integral speaker that operationally communicates with a cellular telephone among other audio equipment.

SUMMARY OF THE INVENTION

The general purpose of the present retractable earphone set, described subsequently in greater detail, is to provide a retractable earphone set which has many novel features that result in a retractable earphone set which is not anticipated, rendered obvious, suggested, or even implied by prior art, either alone or in combination thereof.

To accomplish this, the present retractable earphone set is configured to operationally communicate with a cellular telephone and other audio and electronic equipment capable of relaying audio signals. The retractable earphone set includes a ii durable protective housing having a pair of earphones retractably disposed on a pair of cables disposed through a pair of first apertures disposed at a first end of the housing.

Each of the pair of cables is wound around a first spring wheel assembly disposed within the housing. The first spring wheel assembly is moveable in a circular first direction. When moved in the first direction, each of the pair of cables is extensible through each of the pair of first apertures and the pair of earphones is extended outwardly therefrom, each of the pair of cables unwinding from the first spring wheel assembly. When the first spring wheel assembly is moved in the first direction, the first spring wheel assembly moves against the action of a spring member, which thereby tortionally engages the first spring wheel assembly. When released, as will be described subsequently, the spring member forces the first spring wheel assembly in a circular second direction and the pair of cables is rewound around the first spring wheel assembly, the pair of cables is retracted through each of the pair of first apertures, and the pair of earphones is retracted to a position most proximal the housing.

A first push button is disposed on the housing top side proximal to the first end. The first push button is in operational communication with a first spring wheel assembly disposed within the housing. When the first push button is depressed and held down, the first spring wheel assembly is released and is moveable in each of the first and second directions. Holding down the first push button enables a user to extend the pair of cables, and thus the pair of earphones, for use as desired, pulling each of the pair of cables to move the first spring wheel assembly against the action of the spring. Release of the first push button then arrests the first spring wheel assembly. To retract the pair of cables, and thus retract the pair of earphones to a position most proximal to the housing, the first push button is depressed and held in a depressed position whereupon, in the absence of the imposition of a contrary force (such as when a user pulls on the pair of cables to extend the earphones in the manner previously described), the action of the spring member forces the first spring wheel assembly in the second direction and each of the pair of cables is rewound around the first spring wheel assembly and the earphones are retracted to a position most proximal to the housing.

An alternate embodiment is considered wherein the movement of the first spring wheel assembly in the second direction is engendered when the pair of cables is pulled and then released. The imposition and subsequent immediate release of tension upon the pair of cables is configured to release the first spring wheel assembly whereby the spring member thereafter forcibly rotates the first spring wheel assembly in the second direction to retract the pair of cables.

The instant device also includes a retractable connector cable disposed around a second spring wheel assembly. The connector cable is likewise retractably extensible from within the housing through a second aperture disposed at the housing second end in like manner as described above regarding the pair of cables. A second push button, disposed on the top side of the housing, is in operational communication with the second spring wheel assembly to release the second spring wheel assembly and enable rotation of said second spring wheel assembly in alternately a circular first and second direction wherein the connector cable is alternately extensible and retractable from within the housing. The connector cable may also be retractable after the immediate release of tension upon the connector cable, in the alternate embodiment previously described for the pair of cables.

The connector cable includes an end portion disposed outside the housing. An adaptor connect is disposed endwise upon the end portion, said adaptor connect configured to interconnect with a plurality of jack members configured to interconnect the device with a plurality of extant electronic devices. Thusly, the present retractable earphone set is usable with a plurality of makes and models of extant cell phones, for example, among other electronic and audio equipment capable of relaying audio signals, depending on which particular jack member is presently fitted to the connector cable.

A cable groove is continuously disposed along a first side of the housing. The cable groove is configured to receive and releasably retain the end portion of the connector cable, and any of the plurality of jack members connected thereto, when not in use.

A lapel clip is also attached to the housing to permit the housing to be clipped and secured onto a user's lapel, belt, or other item of apparel, as desired, thus providing quick and convenient access to the device during, before, and after use. A call answer control and a call end control are disposed on a second side of the housing to enable a user to respectively answer and alternately end a phone call on the user's cellular telephone with which the present device is interconnected. A volume up control and a volume down control are also disposed on the second side of the housing to enable a user to respectively increase and alternately decrease the volume of the sound relayed from the cellular telephone.

The device further includes an inbuilt microphone and speaker. The microphone enables pick up and transmission of audio emitted proximal the housing to the device with which the retractable earphone set is interconnected, and the speaker enables preferential use of the retractable earphone set without audio relayed through the pair of earphones but to the speaker, as may be desired.

The present device provides a quick and easy means of retracting the earphones and cables for neat and compact storage without tangling or risking possible damage to the same. Instead of struggling to untangle the retractable cables prior to using an MP3 player or mobile phone, for instance, the device neatly stores the retractable cables within the housing needed, thus assisting in avoiding any distraction with tangled cords while driving that might pose a potential safety hazard. The present device is lightweight, user-friendly, cost-effective, fun to operate and adaptable to different types of audio equipment.

Thus has been broadly outlined the more important features of the present retractable earphone set so that the detailed description thereof that follows may be better understood and in order that the present contribution to the art may be better appreciated.

Numerous objects, features and advantages of the present retractable earphone set will be readily apparent to those of ordinary skill in the art upon reading the following detailed description of presently preferred, but nonetheless illustrative, examples of the present retractable earphone set when taken in conjunction with the accompanying drawings. In this respect, before explaining the current examples of the present retractable earphone set in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the retractable earphone set. It is therefore important that the claims be regarded as including such equivalent constructions insofar as they do not depart from the spirit and scope of the present invention.

Objects of the present retractable earphone set, along with various novel features that characterize the invention are particularly pointed out in the claims forming a part of this disclosure. For better understanding of the retractable earphone set, its operating advantages and specific objects attained by its uses, refer to the accompanying drawings and description.

BRIEF DESCRIPTION OF THE DRAWINGS FIGURES

Figure 2:
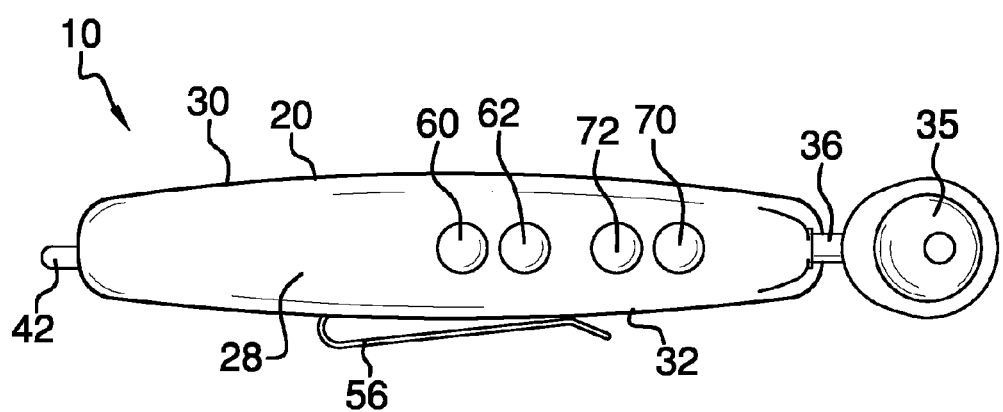
Figure 3:
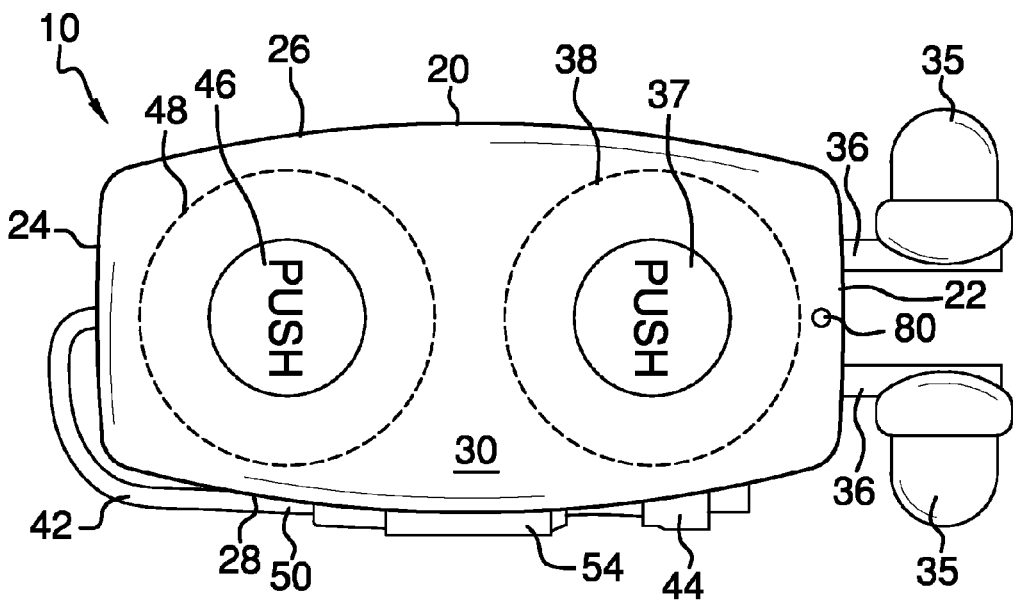
Figure 4:
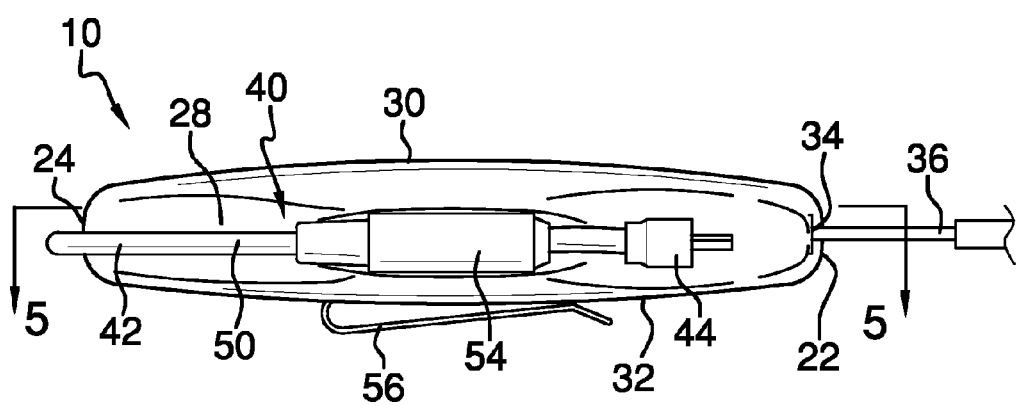
Figure 5:
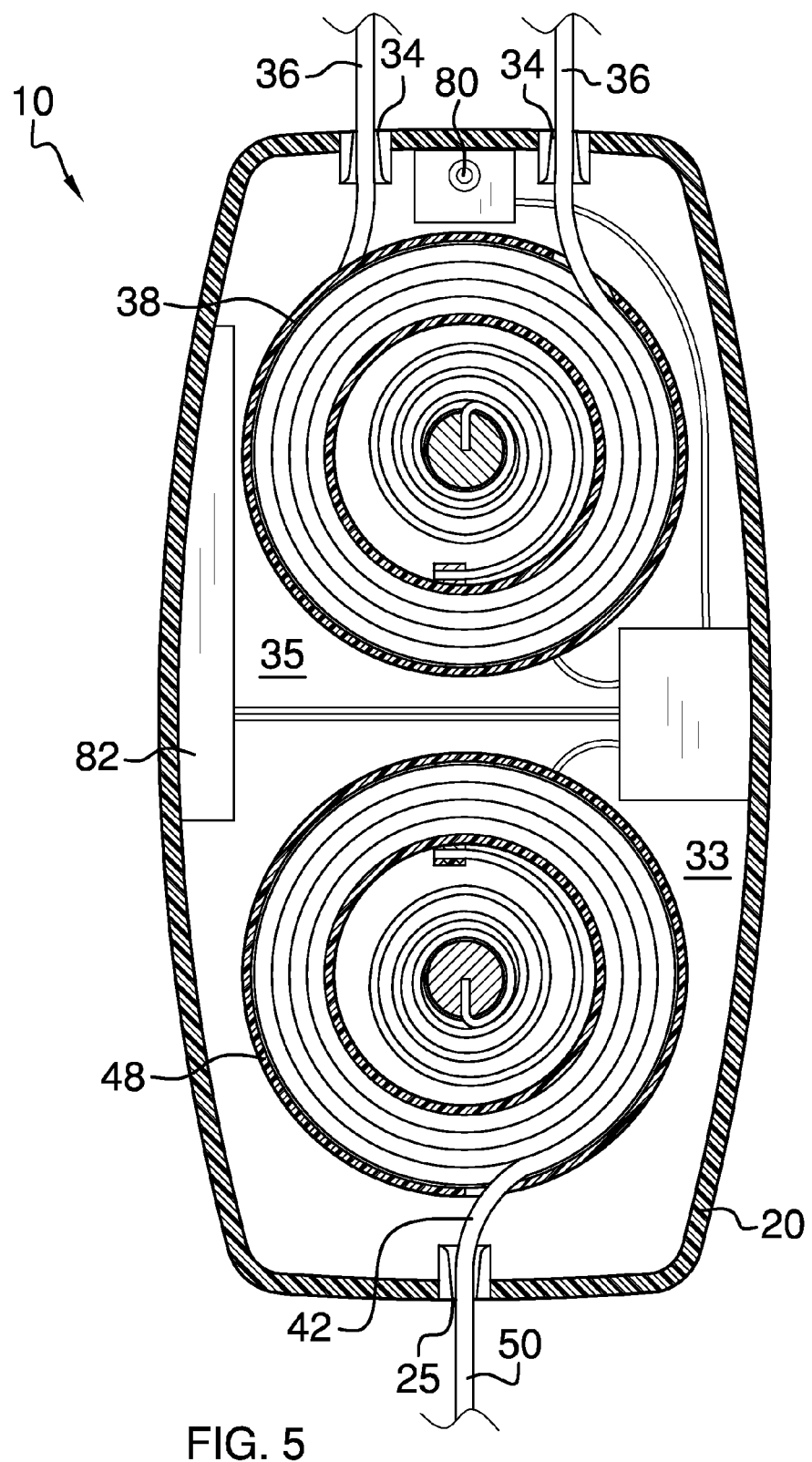
Figure 6:
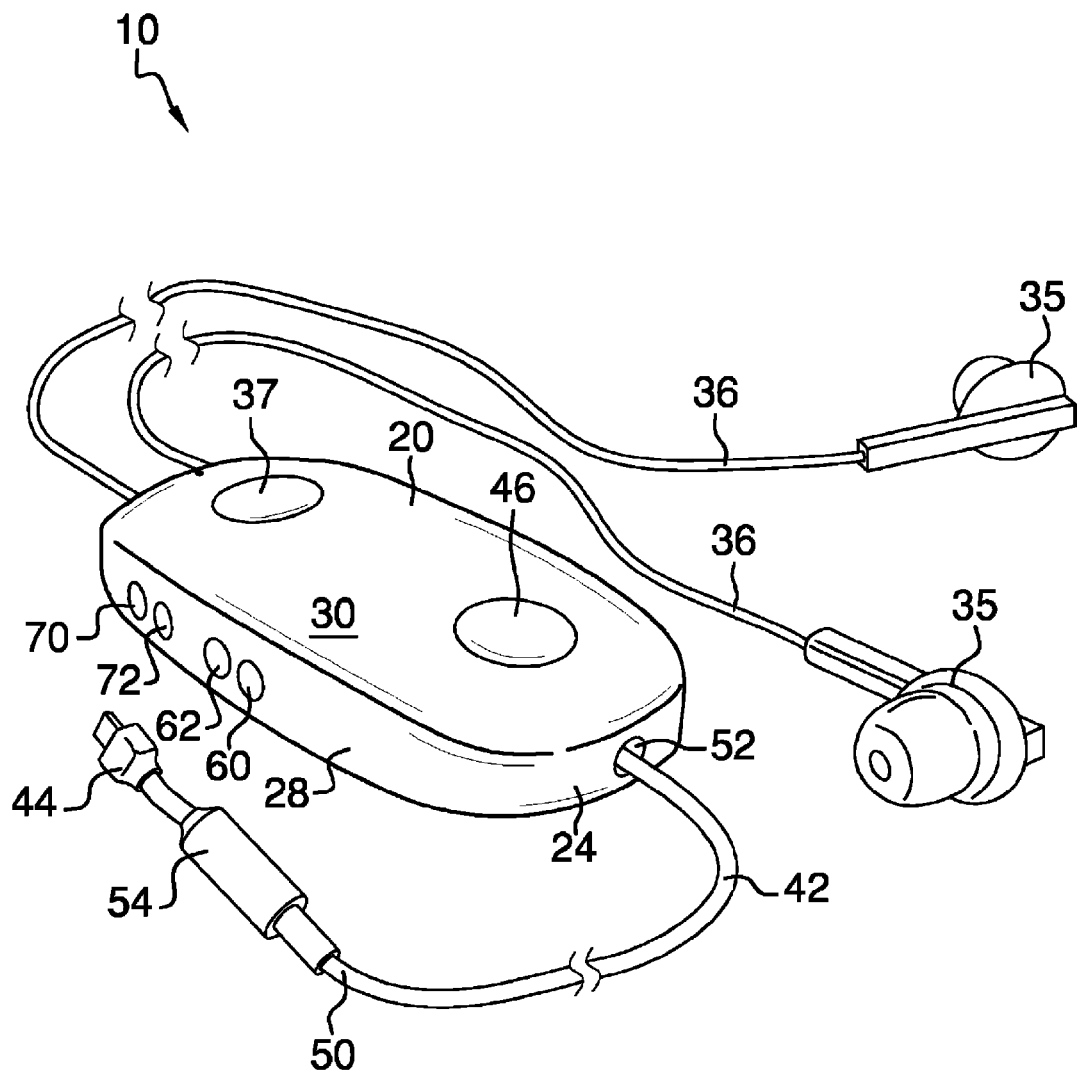

FIG. 1 is an isometric view.
FIG. 2 is a front view.
FIG. 3 is a top view.
FIG. 4 is a side view.
FIG. 5 is a cross-section view taken along the line 5-5 of FIG. 4.
FIG. 6 is an isometric view with a pair of cables and a connector cable in an extended position.

DETAILED DESCRIPTION OF THE DRAWINGS

With reference now to the drawings, and in particular FIGS. 1 through 4 thereof, example of the instant retractable earphone set employing the principles and concepts of the present retractable earphone set and generally designated by the reference number 10 will be described.

Referring to FIGS. 1 through 4 a preferred embodiment of the present retractable earphone set 10 is illustrated. The retractable earphone set 10 includes a housing 20 having a first end 22, a second end 24, a first side 26, a second side 28, a top side 30, and a bottom side 32 defining the bounds of an interior cavity 33. A pair of earphones 35 is retractably disposed upon a pair of cables 36, each of said cables 36 retractably extensible through each of a pair of first apertures 34 disposed in the housing 20 first end 22. Each of the pair of cables 36 is disposed through each of the pair of first apertures 34 and wound around a first spring wheel assembly 38 disposed within the housing 20. The first spring wheel assembly 38 enables extension of each of the pair of cables 36 through each of the first pair of apertures 34, as desired, whereby a desired length of cable is extensible to fit the pair of earphones 35 for comfort of the individual user. The first spring wheel assembly 38 moves in a circular first direction when the pair of cables 36 are unwound. The first spring wheel assembly 38 is torsionally engaged by means of a spring member (not shown) when each of the pair of cables 36 is unwound and the first spring wheel assembly 38 is moved in the first direction. The first spring wheel assembly 38 therefore retracts each of the pair of cables 36 when a first push button 37, disposed on the top side 30 of the housing 20, is depressed and held down in a depressed position whereby the action of the spring member forces the first spring wheel assembly 38 in a circular second direction.

It should be noted that the first spring wheel assembly 38 may include a first spring wheel and a second spring wheel around which a respective one of each of the pair of cables may be wound. In such an embodiment (not shown) the second spring wheel may be disposed interiorly to the second spring wheel and may move in contrary or like circular direction with respect to the first spring wheel when each of the pair of cables 36 is extended and alternately retracted.

The first push button 37 is disposed on the top side 30 of the housing 20 proximal to the housing 20 first end 22. The first push button 37 is in operational communication with the first spring wheel assembly 38. When the first push button 37 is depressed and held down, the first spring wheel assembly 38 is released and rotational movement is possible. When released, the first spring wheel assembly 38 is moveable in the first direction by pulling on each of the pair of earphones 35, and alternately each of the pair of cables 36, against the action of the spring member. Once a desired length of cable has been spooled out from each of the pair of first apertures 34, the first push button 37 is released and the first spring wheel assembly 38 is immobilized. The spring member, which movement in the first direction of the first spring wheel assembly 38 compresses or torsionally engages, applies a force to the first spring wheel assembly 38 wherein release of the first spring wheel assembly 38 by depression of the first push button 37, and subsequently holding said button 37 down, rewinds the pair of cables 36 around the first spring wheel assembly 38, spooling the pair of cables 36 in through the pair of first apertures 34 to retract the pair of earphones 35 to a position most proximal the housing 20.

The instant device 10 also includes a connector cable 42 to permit a user to interconnect the device 10 with an extant cell phone (not shown) or other electronic device capable of relaying audio signals. The connector cable 42 is similarly wound around a second spring wheel assembly 48. The connector cable 42 includes an end portion 50 disposed through a second aperture 52 disposed at the second end 24. The connector cable 42 is therefore likewise retractably extensible from within the housing 20 when the second spring wheel assembly 48 is forced in a circular first direction (such as, for example, when the connector cable 42 is pulled by the end portion 50).

A second push button 46 is disposed on the top side 30 of the housing 20 proximal to the housing 20 second end 24. The second push button 46 is in operational communication with the second spring wheel assembly 48 in the same manner and form as described previously regarding the first push button 37 and the first spring wheel assembly 38. Extension and retraction of the connector cable 42 is therefore possible when the second push button 46 is depressed and held down in like manner as previously described for the first push button 37.

An adaptor connect 54 is disposed endwise on the end portion 50 of the connector cable 42. The adaptor connect 54 is interconnectable with a plurality of jack members 44. Each of the plurality of jack members 44 is configured to interconnect with different types of electronic and audio equipment, makes and models of cell phones.

A cable groove 40 is continuously disposed along the second side 26 of the housing 20. The cable groove 40 is configured to receive and releasably retain the end portion 50 of the connector cable 42. Each of the plurality of jack members 44, operationally communicable with various makes and models of cell telephones and other audio equipment, as desired, is attachable to the connector cable 42 by means of the adaptor connect 54, thus permitting each jack member 44 to communicate between the digital consumer electronic device at hand for a particular user, a source of power, and alternately a communication device, such as a computer, via a USB cable/port, for example. The cable groove 40 removably retains the connector cable 42 and each of the jack members 44 so connected thereto to secure the connector cable 42 and the particular jack member 44 being used onto the housing 20.

A lapel clip 56 is also attached to the housing 20 to permit the housing 20 to be clipped and secured onto a user's lapel, belt, or other item of apparel, as desired, thus providing quick and convenient access to the device 10 before, during, and after use.

A call answer control 60 and a call end control 62 are disposed on the second side 28 of the housing 20 thus allowing a user to answer and alternately end a phone call on the user's cellular telephone with which the device 10 is connected by pushing the respective call answer control 60 and call end control 62 conveniently disposed on the housing 20 at the appropriate time.

A volume up control 70 and a volume down control 72 are disposed on the second side 28 of the housing 20 proximal to the call answer control 60 and the call end control 62 thus allowing a user to increase and alternately decrease the volume of the sound relayed from the cellular telephone to each of the pair of earphones 35, as desired, by pressing the respective volume up control 70 and volume down control 72.

The device 10 further includes an inbuilt microphone 80 and speaker 82. The microphone 80 is configured to pick up sounds emitted proximal thereto and relay said sounds as audio signals to the device with which the present retractable earphone set 10 is connected. The speaker 82, disposed on the housing 20, enables use of the retractable earphone set 10 without audio relayed to each of the pair of earphones 35, as desired, whereby audio signals relayed through the retractable earphone set 10 are relayed directly to the speaker 82 and played therethrough. It should be noted that selection means for activating the speaker 82 in preference over the earphones 35 is intended, such selection means including, for example, simultaneous depression of the volume up control 70 and volume down control 72 wherein simultaneous depression of said volume controls 70, 72 activates the speaker 82 and a second simultaneous depression of said volume controls 70, 72 deactivates said speaker 82. Alternate selection means may include, however, a speaker select button (not shown) which directly activates and deactivates said speaker 82, as desired.

The connector cable 42 extends to a maximum length of approximately 1 m. The pair of cables 36 extend to a maximum length of approximately 500 mm.

With respect to the above description then, it is to be realized that the optimum dimensional relationships for the parts of the present retractable earphone set to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A retractable earphone comprising:
  a housing;
  a first spring wheel assembly rotatably disposed within the housing;
  a second spring wheel assembly rotatably disposed within the housing;
  at least one cable disposed upon the first spring wheel assembly, the at least one cable extensible from within the housing when the first spring wheel assembly is rotated in a first direction and retractable within the housing when the first spring wheel assembly is rotated in a second direction;
  each of at least one earphone disposed endwise on each of the at least one cable;
  a connector cable disposed around the second spring wheel assembly, said connector cable extensible from within the housing when the second spring wheel assembly is rotated in a first direction and retractable within the housing when the second spring wheel assembly is rotated in a second direction;
  wherein movement of the first spring wheel assembly in the first direction unwinds and extends the at least one cable against the action of a spring member and movement of the first spring wheel assembly in the second direction is forced by means of the spring member when the first spring wheel assembly is released whereby the at least one earphone is retracted to a position most proximal the housing;

wherein movement of the second spring wheel assembly in the first direction unwinds and extends the connector cable against the action of a spring member and movement of the second spring wheel assembly in the second direction is forced by means of the spring member when the second spring wheel assembly is released whereby an end portion of the connector cable is retracted to a position most proximal the housing;

wherein the housing further comprises:
 a first end, a second end, a first side, a second side, a top side, a bottom side, and an interior cavity;
 at least one first aperture disposed at the first end;
 a second aperture disposed at the second end;
 wherein each of the at least one cable is disposed through each of the at least one first aperture and the connector cable is disposed through the second aperture;

a first push button disposed on the housing top side proximal to the first end, said first push button in operational communication with the first spring wheel assembly; and a second push button disposed on the housing top side proximal to the second end, said second push button in operational communication with the second spring wheel assembly;

wherein depression of the first push button releases the first spring wheel assembly to enable rotation in the first and alternately the second direction and depression of the second push button releases the second spring wheel assembly to enable rotation in the first and alternately the second direction, whereby the at least one earphone is alternately extensible and retractable within the housing when the first push button is depressed and the connector cable is alternately extensible and retractable within the housing when the second push button is depressed.

2. The retractable earphone set of claim 1 further comprising a call answer control and a call end control disposed on the housing wherein the retractable earphone set is communicable with an extant cell phone to receive and alternately end a call placed to the cell phone whereby audio signals relayed to the cell phone are relayed through the retractable earphone set.

3. The retractable earphone set of claim 2 wherein the housing further comprises a cable groove disposed across the first side of the housing, said cable groove configured to receive and releasably retain the end portion of the connector cable.

4. The retractable earphone set of claim 3 wherein the connector cable further comprises an adaptor connect disposed endwise upon the end portion, said adaptor connect configured to interconnect with each of a plurality of jack members, each of said plurality of jack members configured for interconnection with a particular make and model of cell phone, computer, audio player, or other electronic device capable of relaying audio signals to the at least one earphone.

5. The retractable earphone set of claim 4 further comprising a microphone disposed within the housing wherein audio emitted proximal the housing is transmittable by the retractable earphone set to an extant cell phone, computer, audio recorder, audio player, or other electronic device capable of relaying audio signals, with which the device is interconnected.

6. The retractable earphone set of claim 5 further comprising a speaker disposed upon the housing wherein selection of the speaker selectively relays audio through the speaker instead of through the at least one earphone.

7. A retractable earphone set comprising:
 a housing having a first end, a second end, a first side, a second side; a top side, and a bottom side;
 an interior cavity;
 a pair of first apertures disposed at the first end, each of the pair of first apertures in open communication with the interior cavity;
 a second aperture disposed at the second end, said second aperture in open communication with the interior cavity;
 a first spring wheel assembly disposed in the interior cavity proximal to the first end;
 a pair of cables retractably disposed around the first spring wheel assembly and disposed through each of the pair of first apertures whereby each of the pair of cables is retractably extensible from within the housing;
 a pair of earphones disposed endwise upon the pair of cables exterior to the housing;
 a second spring wheel assembly disposed in the interior cavity proximal to the second end;
 a connector cable retractably disposed around the second spring wheel assembly;
 an adaptor connect disposed endwise on the connector cable, said adaptor connect interconnectable with a plurality of jack members, each of said jack members configured to releasably connect and enable communication with a particular extant electronic device capable of relaying audio signals;
 a first push button disposed on the housing top side, said first push button depressible to release the first spring wheel assembly whereby the pair of earphones may be extended therefrom and retracted thereto;
 a second push button disposed on the top side, said second push button depressible to release the second spring wheel assembly whereby the connector cable may be extended therefrom and retracted thereto;
 a cable groove continuously disposed along the first side, said cable groove configured to releasably receive and retain an end portion of the connector cable when said cable is not in use;
 a lapel clip disposed upon the bottom side to releasably clip the housing to a user's apparel, as desired;
 a call answer control disposed on the second side of the housing, said call answer control depressible to answer an incoming call to an extant cell phone to which the retractable earphone set is connected;
 a call end control disposed on the second side of the housing, said call end control disposed proximal to the call answer control, the call end control usable to end a call received upon an extant cell phone to which the retractable earphone set is connected;
 a volume up and a volume down control disposed on the second side of the housing whereby the volume of audio relayed through the retractable earphone set is controllable;
 a speaker disposed in the housing;
 a microphone disposed in the housing;
 wherein the retractable earphone set is interconnectable with an extant cell phone, or other electronic device capable of relaying audio signals, whereby said audio signals are communicable through the retractable earphone set and each of the pair of earphones is retractable to abut each of the pair of first apertures when not in use and the connect cable is retractable and an end portion of the connect cable is releasably retainable within the cable groove.

\* \* \* \* \*